INVENTORS
M. KENNETH OSHMAN
STEPHEN E. HARRIS

BY John F Lawler
ATTORNEY

United States Patent Office 3,431,514
Patented Mar. 4, 1969

3,431,514
LASER FREQUENCY STABILIZATION
Malin Kenneth Oshman, Sunnyvale, and Stephen E. Harris, Palo Alto, Calif., assignors to Sylvania Electric Products Inc., a corporation of Delaware
Continuation-in-part of application Ser. No. 460,438, June 1, 1965. This application Dec. 29, 1967, Ser. No. 621,088
U.S. Cl. 331—94.5
Int. Cl. H01s 3/00
8 Claims

ABSTRACT OF THE DISCLOSURE

Laser stabilization apparatus and technique utilizing the fundamental and second harmonic of the average intermode spacing of an FM laser to provide an error discriminant. The fundamental frequency is compared with the second harmonic and the variation in beat amplitudes, which is proportional to deviation of the oscillation modes from the center of the atomic gain profile, is applied to a transducer to change the cavity size and stabilize the frequency. The phase of the fundamental frequency is detected and used to sense the direction of frequency deviation.

---

This is a continuation-in-part of Ser. No. 460,438 filed June 1, 1965.

This invention relates to lasers and more particularly to a method of and apparatus for stabilizing the frequency of a laser.

Present day lasers generally comprise an active light amplifying element in a resonant structure such as a Fabry-Perot interferometer having mirrors spaced on opposite ends of the amplifying element. The laser oscillates in a number of modes, i.e., at several discrete frequencies which correspond to those resonant frequencies for which the active medium provides sufficient gain to overcome losses. These several oscillation modes are separated from one another by a frequency which is relatively insensitive to vibrations and thermal expansion (motions on the order of microns); however, the position of these modes with respect to the center frequency of the atomic gain profile of the laser is critically dependent upon dimensions of the resonant structure. As a result of slight changes in the size of the structure due to unavoidable mechanical vibrations or thermal effects, the frequencies of the laser modes change randomly and thus produce instability in the output frequency of the laser.

In the past, one effort to stabilize the frequency of a laser took the form of a second temperature controlled resonant structure through which the output of the laser is passed. Changes in frequency of the laser are detected by measuring power transmitted through the second structure. The difficulties with this stabilization technique are the practical limits imposed by the achievable mechanical stability of the reference structure and the inability to detect direction of change of frequency of the laser being controlled.

Another proposal for stabilizing the frequency of a laser is described in a paper entitled "Frequency Stabilization of Single Mode Gas Lasers" by A. D. White, E. I. Gordon and E. F. Labuda, Applied Physics Letters, Sept. 1, 1964, p. 97–99. Briefly, the output of the laser is passed through an absorption cell to which a magnetic field has been applied. The cell then exhibits different absorption characteristics as a function of frequency for right and left circularly polarized light. Linearly polarized light passing out of this cell has a polarization dependent upon the frequency of light into the cell. However, tuning of the absorption line of the cell which results from changes in temperature can cause serious problems, and in practice the frequency characteristic of this cell has not permitted precise frequency control.

Still another method of frequency stabilization is proposed in a paper entitled "Frequency Stability of He-Ne Masers and Measurements of Length" by Jaseja, Javan and Townes, Physical Review Letters, Mar. 1, 1963, p. 165–167. This technique is based on the existence of a slight dip in power output near the center frequency of a Doppler broadened laser transition. The power dip is rather small and loses sensitivity at the center of the transition since the change in power for a change in frequency is a slowly varying function near line center. Also, this technique is useful only with lasers which have a Doppler broadened gain profile, i.e., gas lassers.

A general object of this invention is the provision of a method of and apparatus for absolute stabilization of the oscillation frequency of a laser wherein stabilization is based on properties of the laser and is not dependent upon an external reference element or structure.

Another object is the provision of a laser stabilization technique which not only detects frequency change but also the direction of that change.

Still another object is the provision of a frequency stabilization technique which is applicable to solid state lasers, such as a ruby laser, as well as gas lasers.

A further object is the provision of a laser frequency stabilization technique which is insensitive to variations in power.

These and other objects of the invention are accomplished by causing the laser to oscillate with phases and amplitudes charateceristic of a frequency modulated (FM) laser and utilizing the residual distortion in the FM laser oscillation as an error signal to control the size of the laser cavity. An FM laser useful in the practice of this invention is described in the article entitled "FM Oscillation of the He-Ne Laser" by S. E. Harris and Russell Targ, Applied Physics Letters, Nov. 15, 1964, pp. 202–204. Ideally, the output of the FM laser consists of a set of frequencies or modes with appropriate amplitudes and phases to form the sidebands of a frequency-modulated signal with its carrier frequency near the center frequency of the gain profile of the laser transition. While an ideal signal would produce no output at frequencies corresponding to the multiples of the frequency separation of the sidebands when detected by a square-law detector, in practice there is a slight distortion of the FM laser output which appears as a beat signal. This beat signal changes in amplitude and phase as the FM spectrum shifts with respect to the center frequency of the laser transition. Therefore by holding the detected beat constant, preferably at a minimum, the center frequency of the FM oscillation is likewise held constant.

In accordance with this invention, the variation in beat amplitude is detected by comparing the amplitudes of the fundamental and second harmonic of the average frequency spacing ($f=c/2L$) of the FM laser modes. The amplitude of the fundamental frequency undergoes a large change for a small change in laser center frequency whereas the change in amplitude of the second harmonic is slight. The phase of the beat at the fundamental frequency is also compared with a reference (for example, the driving source for the internal phase perturbation of the FM laser) to determine the direction of change of the laser frequency from the center frequency since there is a 180 degree phase difference between the beat on one side of line center with respect to the other side. The outputs of thse two comparators are then processed by feedback electronics and applied to a transducer which changes the size of the laser cavity to compensate for the drift in laser frequency.

This stabilizing technique and apparatus are also advantageously applicable to an FM laser operating in its phase-locked region wherein the laser output consists of a series of pulses rather than the FM output. The frequency spectrum of the phase-locked laser has modes with amplitudes proportional to a Gaussian envelope centered on the laser transistion and relative phases which are constant and approximately zero in most cases. Such a laser, termed a "phase-locked" laser, occasionally or intermittently operates in such a manner that output pulses occur twice as often as in the case with zero relative phase between the modes, a phenomenon called double spiking. The phases of these modes adjust so that no odd (e.g., 1, 3, 5, etc.) harmonic beats are present when the oscillation and laser line center are coincident but do appear when the oscillation drifts above or below the laser line center. In accordance with this invention, the phase and amplitude of these beats are sensed as described above to provide a correction signal for application to the cavity transducer to compensate for the frequency drift.

These and other objects of the invention will become apparent from the following description of a preferred embodiment thereof, reference being had to the accompanying drawings in which.

Figure 2:
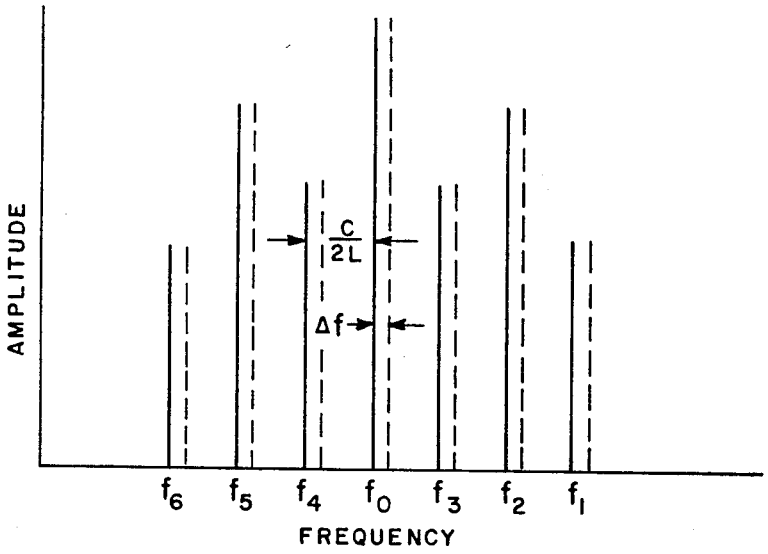
FIGURE 2 is a schematic diagram of the oscillating modes of an FM laser.
Figure 5:
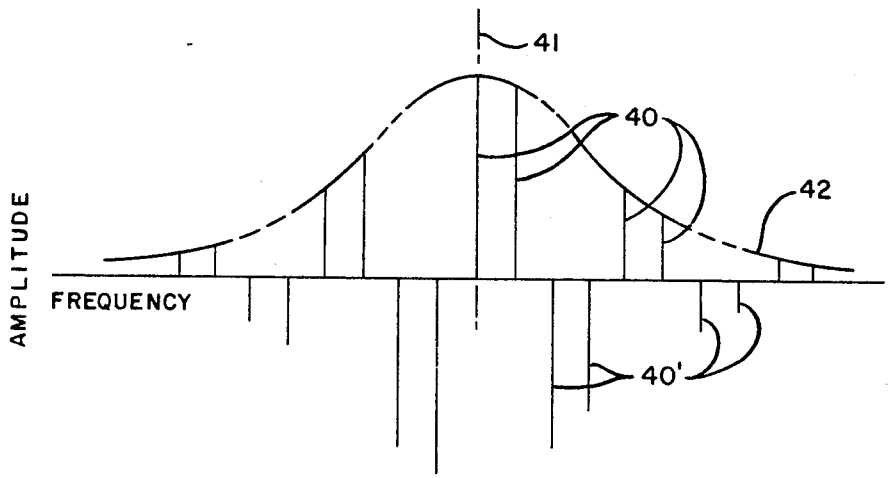

FIGURE 5 is a schematic diagram similar to FIGURE 2 showing the oscillating modes of a phase-locked laser with which the invention may be practiced; and FIGURES 6A to 6D are schematic diagrams showing the time relationship of the modulation signal and the pulsed outputs of a double spiking phase-locked laser when the center of oscillation is coincident with and on either side of the laser line center.

Figure 1:
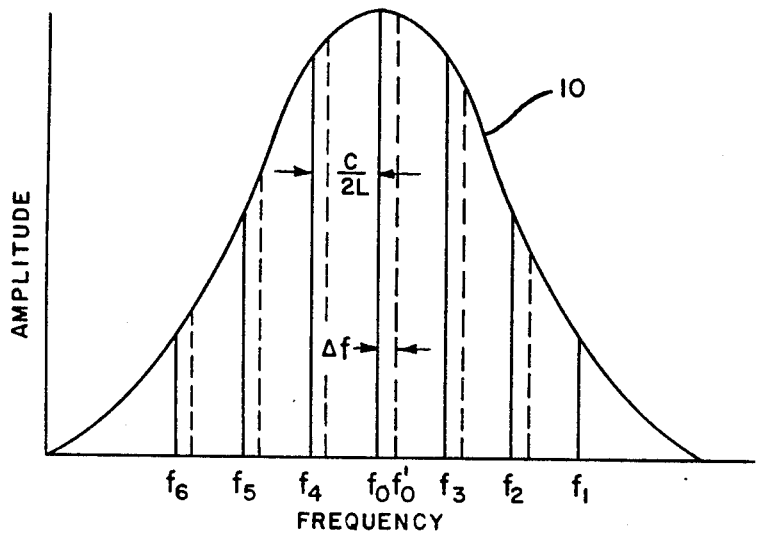
FIGURE 1 is a schematic diagram of the atomic gain profile of a laser showing the separate oscillating modes.

Referring now to the drawings, FIGURE 1 shows the atomic gain profile of a free-running laser as a curve 10 comprising a plurality of oscillation modes at frequencies $f_1$ to $f_6$, inclusive, symmetrical about a center frequency $f_0$. The several modes oscillate with random amplitudes and phases and have an average intermode frequency spacing equal to $c/2L$, where $c$ is the velocity of light and $L$ is the length of the laser cavity. Slight changes in the length of the cavity as a result of changes in temperature or mechanical vibrations produce a shift in the frequencies at which the modes oscillate and this appears as a change in the position of these modes with respect to the gain profile to the dotted line position shown in FIGURE 1. The resultant shift $\Delta f$ in the center frequency to $f_0'$ represents an instability in laser operation which is generally undesirable.

The same frequency instability or distortion described above is present in a frequency modulated (FM) laser which is characterized by a plurality of oscillating modes as shown schematically in solid line in FIGURE 2. The several modes of the FM laser oscillate with FM phases at frequencies $f_1$ to $f_6$ which are symmetrical about a center frequency $f_0$ and characteristically have Bessel function amplitudes. Such an FM laser may be produced by introducing an internal phase modulation into the laser cavity at a frequency slightly detuned from the average frequency separation $c/2L$ of the modes as described in the paper by Harris and Targ identified above. If an FM laser were to produce an ideal FM output, it would oscillate with no variation in intensity and therefore no beat frequency signals would be produced by the several oscillating modes. In practice, however, residual distortion is always present in the output of the FM laser, such distortion being represented as slight variations in the intensity of the laser. As a result of this residual distortion, the output of an FM laser contains beat frequency signals at frequencies equal to the mode separation $c/2L$ as well as harmonics thereof including the second harmonic $2c/2L$.

Figure 3:
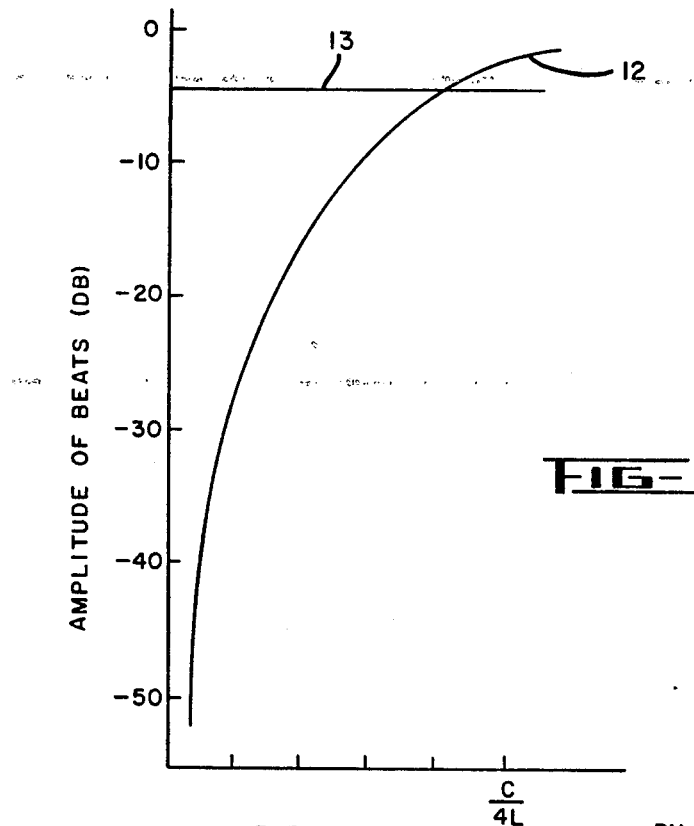
FIGURE 3 is a curve showing a comparison in the change in amplitude of the first and second harmonics of the intermode frequency with changes in laser frequency.

We have discovered that as the center frequency of the FM laser spectrum changes, the distortion signal at the fundamental beat frequency $c/2L$ undergoes a large change in amplitude as compared with the amplitude change of the second harmonic $2c/2L$ of the distortion signal. For example, in an FM laser of the type described by Harris and Targ in the aforementioned publication, a change in amplitude of the fundamental beat frequency signal greater than 30 db was detected for a shift of one-half the intermode spacing while the corresponding change in the second harmonic was less than 3 db. This response is illustrated graphically in FIGURE 3 by curve 12 which represents the changes in amplitude of the fundamental beat signal with change in the center frequency of the FM spectrum and curve 13 which denotes the change for the second harmonic beat signal.

We have also discovered that the phase of the beat frequency signal is dependent upon the direction of the shift of the center frequency of the FM oscillation from the center frequency of the transition. For example, a shift of the center frequency $f_0$, see FIGURE 2, to the right as viewed to the dotted line position shown, produces a beat signal with a phase opposite that of the beat signal produced by a shift to the left (as viewed) of the center frequency. This phase differential therefore provides a means of sensing the direction of shift of the FM laser center frequency so that a control signal of the proper sense may be generated to correct the drift.

Figure 4:
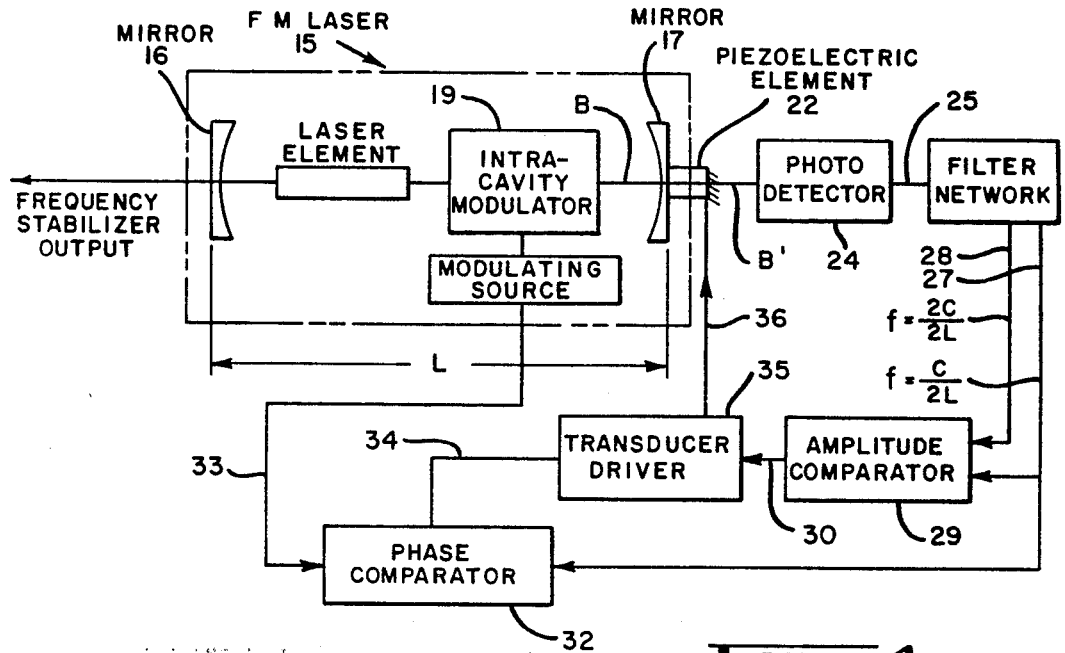
FIGURE 4 is a block diagram of frequency stabilizing apparatus embodying this invention.

In accordance with the invention based upon these discoveries, apparatus providing a frequency stabilized laser output is shown in FIGURE 4. The apparatus comprises an FM laser 15 having partially reflecting mirrors 16 and 17 axially spaced by a distance L, a laser element 18, such as a tube of He-Ne gas or a ruby rod, and an optic modulator 19 spaced between element 18 and mirror 17 and energized by a modulating source 20. A coherent light beam B generated by this laser has modes which oscillate with FM phases and with substantially Bessel function amplitudes and thus constitutes an FM signal. The FM laser oscillator 15 is described in detail in the aforementioned publication and does not per se constitute this invention.

A piezoelectric element 22, such as a crystal of lead-zirconate-titanate (PZT), is mounted on mirror 17 in such a manner as to move the mirror axially in response to an applied voltage and thereby adjust the spacing L between the mirrors. Element 22 is mounted in such a manner as not to interfer with the portion B' of the coherent light beam B which passes through mirror 17 and thus may be offset from the beam or may have the form of a tube or washer.

A photodetector 24 aligned with the FM laser 15 demodulates beam B' and produces on output line 25 beat signals which result from the residual distortion of the FM laser. A filter network 26 receives the output of the photodetector 24 and isolates the fundamental and second harmonic of the beat frequency signals which appear on output lines 27 and 28, respectively, of this network. By way of example, photodetector 24 may be a traveling wave phototube of the type described in an article entitled "Photomixing Experiments with a Ruby Optical Maser and a Traveling Wave Microwave Phototube," by B. J. McMurtry and A. E. Siegman, Applied Optics, volume 1, January 1962, pp. 51–54. Filter network 26 typically may be two narrow band radio frequency amplifiers tuned to the resspective desired frequencies.

In order to determine the magnitude of the change in the center frequency of the FM laser, the ratio of the amplitudes of the fundamental and second harmonic of the beat frequency signals is determined by an amplitude comparator 29 to which lines 27 and 28 are connected. This comparator uses the second harmonic as a reference with which the fundamental beat signal is compared, and the ratio in amplitudes of these signals appears at the output 30 of the comparator. By detecting this ratio, random fluctuations in output laser power which do not arise from a shift of the frequency of the FM oscillation will not be erroneously detected as a frequency shift, that is, the level of both the fundamental and second harmonic distortion will change; however, their ratio will only change in response to changes in frequency. Typically, comparator 29 may consist of two logarithmic amplifiers whose output is fed into a differential amplifier.

In order to determine the direction of shift of the laser center frequency, the phase of the fundamental beat frequency signal on line 27 is detected by a phase comparator 32 and is related to the phase of a reference signal on line 33 from the modulating source 20 of the FM laser. The output of the phase comparator on line 34 is a voltage having a polarity indicative of the phase relationship of the input signals to the comparator. Thus, a signal having a positive polarity, for example, indicates that the center frequency has drifted to the right as viewed in FIGURE 2 and a signal with a negative polarity indicates a frequency shift to the left as viewed. Phase comparator 32 is a nonlinear crystal which mixes the two inputs on lines 27 and 33.

The outputs of the amplitude comparator and phase comparator on lines 30 and 34, respectively, are applied as inputs to a transducer driver 35 which produces a correction signal on output line 36 related to the amplitude of the signal on line 30 and having a polarity corresponding to that of the signal on line 34. Control element 22 is electrically connected to the output of driver 35 by line 36 and displaces mirror 17 relative to mirror 16 in a direction corresponding to the polarity of the transducer driver output and to a degree corresponding to the amplitude thereof. The correction signal generated by driver 35 is therefore sufficient in magnitude and of proper sense to restore the cavity to its original size. The drift of the center frequency of the FM laser is therefore corrected and stabilization of the frequency of the laser output from mirror 16 is achieved.

The stabilized output of the laser 15 is a beam comprised of modes oscillating with FM phases and substantially Bessel function ampltiudes so as to constitute essentially an FM signal. In applications which require a signal at a single stabilized frequency, the output of laser 15 may be passed through an electro-optic modulator driven at the same frequency as intracavity modulator 19 but 180 degrees out of phase therewith. This technique for producing a single frequency laser is fully described and claimed in a copending application of Gail A. Massey, Ser. No. 411,441, filed Nov. 16, 1964.

The apparatus shown in FIGURE 4 also has utility for stabilizing the frequency of an FM laser operating in the phase-locked region as distinguished from the ideal FM region to which the foregoing discussion was addressed. A detailed analysis of the operation of the FM laser in the phase-locked and FM regions is presented in an article entitled Detailed Experiments On Helium-Neon FM Lasers by E. O. Ammann, B. J. McMurtry, and M. K. Oshman, IEEE Journal of Quantum Electronics, September 1965, pp. 263–272.

Figure 6:
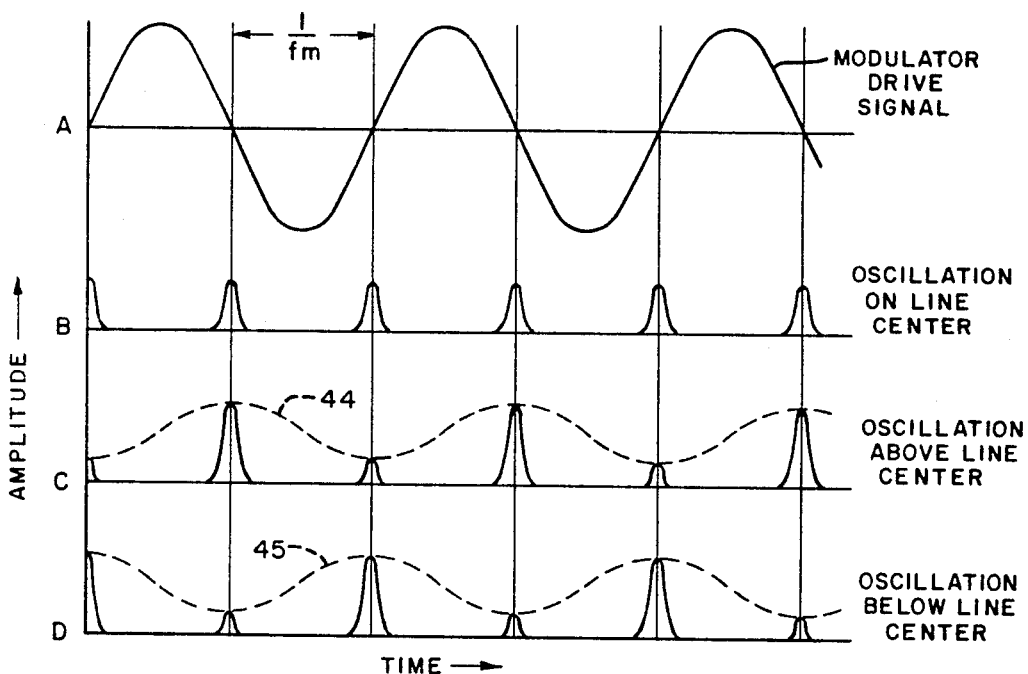

Briefly, operation in the phase-locked region occurs when the modulator 19 in the laser cavity is tuned at or near the frequency $c/2L$ corresponding to the axial mode interval of the laser such that the detuning, if any, is less than that which causes the laser to operate in the FM region. The time domain output of the phase-locked laser is a series of sharp regularly spaced pulses as shown in FIGURE 6B in contrast to the FM output when the laser operates in the FM region. Intermittently the phase-locked laser operates so that the output pulses occur twice as frequently as in the phase-locked laser having zero relative phase between modes, called "double spiking," and the beats between the modes detected by the photo-detector show the following characteristics: the second, fourth, sixth, etc. beats between modes are steady and enhanced but the first, third, fifth, etc. beats are unsteady and greatly reduced in amplitude. It is this observed suppression and instability of the odd harmonic beats in the double spiking phase-locked laser which, according to this invention, provides a convenient discriminant useful in stabilizing the frequency of the laser.

During the occurrence of double spiking of the laser, all of its modes are oscillating at their Gaussian determined amplitudes. The relative phases of these modes are no longer zero degrees but adjust as illustrated in FIGURE 5 with modes 40 and 40' extending above and below the base line to indicate the 180-degree relative phase difference and with the center of the oscillation denoted by the midline 41 of the Gaussian envelope 42 coincident with the laser line center so that there are no odd harmonic beats. As the center of this oscillation drifts with respect to the laser line center, the phases and amplitudes distort so that there is a resultant beat at the frequency $f_m$ of the drive signal to the intra-cavity modulator, see FIGURE 6A. The phase of this beat signal also changes by 180 degrees as the center 41 of oscillation drifts from one side of the laser line center to the other.

This phenomenon is illustrated in FIGURES 6C and 6D which show the phase variations in the laser output for such drifting with respect to the laser line center. The profiles 44 and 45 of these outputs are 180 degrees out of phase with each other and so provide a discriminant capable of sensing the direction as well as the amount of drift.

The apparatus shown in FIGURE 4 thus may be utilized in the manner described above to stabilize the frequency of the laser operating in the phase-locked region as well as one operating in the FM region.

Changes, modifications and improvements in the above described preferred embodiment of the invention may be made by those skilled in the art without departing from the spirit and scope of the invention. The appended claims therefore describe the novel features of the invention.

We claim:

1. Apparatus for producing a frequency stabilized laser beam comprising in combination
    an FM laser of the type described having a cavity structure, the beam of said FM laser being characterized by a plurality of oscillation modes, and
    means responsive to the amplitude of the beat at the fundamental of the intermode frequency for changing the size of the cavity to reduce the fundamental beat amplitude.

2. The apparatus according to claim 1 in which said last named means comprises
    means for detecting and isolating beat signals of said modes at frequencies equal to the fundamental and second harmonic of the intermode frequency separation,
    means for comparing the amplitudes of said beat signals for deriving a control signal, and
    a transducer element connected to the cavity structure of the FM laser and responsive to said control signal for changing the size of the laser cavity to minimize the amplitude of the beat at the fundamental of the intermode frequency.

3. Apparatus according to claim 2 in which said FM laser has a cavity structure with a predetermined optical length L operative to produce a beam with a plurality of oscillating modes having an average frequency spacing of $c/2L$, where $c$ is the velocity of light.
    said laser including an optical phase modulator and means to drive said modulator at a predetermined modulation frequency, the frequencies of said beat signals being $c/2L$ and $2c/2L$, respectively, means for comparing the phase of one of said beat signals with the phase of the modulator drive means to drive a second control signal, and means for energizing said transducer element in response to said second control signal as well as the first named control signal whereby to produce such a change in cavity length as to minimize the ratio of the amplitude of the beat signal having a frequency $c/2L$ to that of the beat signal having a frequency $2c/2L$.

4. Apparatus according to claim 3 in which said modulation frequency is such as to cause operation of said FM laser in the FM region.

5. The apparatus according to claim 3 in which said modulation frequency is such as to cause operation of said FM laser in the phase-locked region.

6. Apparatus according to claim 3 in which said detecting and isolating means comprises
- a photodetector responsive to said beam and producing an output containing beat signals at frequencies of $c/2L$ and harmonics thereof, and
- a filter network receiving the output of said photodetector and deriving two beat signals having frequencies of $c/2L$ and $2c/2L$, respectively.

7. The method of stabilizing the frequency of the output of a laser having a plurality of oscillation modes with an intermode frequency spacing equal to $c/2L$ where $L$ is the optical length of the laser cavity and $c$ is the velocity of light, consisting of the steps of detecting beat signals of the oscillation modes and isolating two of said signals having frequencies of $c/2L$ and $2c/2L$, comparing the amplitudes of said two beat signals to derive a control signal proportional to the distortion in the laser output, and applying said control signal to a transducer for changing the length $L$ of the laser cavity to reduce to a minimum value the magnitude of said control signal.

8. The method according to claim 7 with the steps of phase modulating the laser beam at a frequency approximately equal to the intermode frequency spacing, comparing the phase of one of said beat signals with the phase of the modulating signal to derive a second control signal, and applying both of said control signals to said transducer.

References Cited

UNITED STATES PATENTS

| | | | |
|---|---|---|---|
| 3,170,122 | 2/1965 | Bennett | 331—94.5 |
| 3,361,990 | 1/1968 | Gordon et al. | 331—94.5 |

JEWELL H. PEDERSEN, *Primary Examiner.*

WILIAM L. SIKES, *Assistant Examiner.*

U.S. Cl. X.R.

250—199

UNITED STATES PATENT OFFICE
CERTIFICATE OF CORRECTION

Patent No. 3,431,514　　　　　　　　　　　　　　　　　　　March 4, 1969

Malin Kenneth Oshman et al.

It is certified that error appears in the above identified patent and that said Letters Patent are hereby corrected as shown below:

In the drawings, sheets 1 to 3, line 3 and in the heading to the printed specification, line 7, "Dec. 29, 1967", each occurrence, should read -- Dec. 29, 1966 --.

Signed and sealed this 31st day of March 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents